United States Patent [19]

Habermeier

[11] 4,034,019

[45] * July 5, 1977

[54] LINEAR COPOLYESTERS BASED ON TEREPHTHALIC ACID AND/OR ISOPHTHALIC ACID

[75] Inventor: Jürgen Habermeier, Pfeffingen, Switzerland

[73] Assignee: Ciba-Geigy Corporation, Ardsley, N.Y.

[*] Notice: The portion of the term of this patent subsequent to July 5, 1994, has been disclaimed.

[22] Filed: July 21, 1975

[21] Appl. No.: 597,610

[30] Foreign Application Priority Data

July 30, 1974 Switzerland .................. 10476/74

[52] U.S. Cl. .......................... 260/860; 260/75 N
[51] Int. Cl.$^2$ .................. C08L 67/02; C08G 63/68
[58] Field of Search .......................... 260/75 N, 860

[56] References Cited

UNITED STATES PATENTS

| | | | |
|---|---|---|---|
| 3,856,754 | 12/1974 | Habermeier et al. | 260/75 N |
| 3,860,564 | 1/1975 | Habermeier et al. | 260/75 N |

FOREIGN PATENTS OR APPLICATIONS 2,121,184  11/1971  Germany

*Primary Examiner*—Howard E. Schain
*Assistant Examiner*—W. C. Danison, Jr.
*Attorney, Agent, or Firm*—Luther A. R. Hall

[57] ABSTRACT

Linear, thermoplastic copolyesters based on terephthalic acid and/or isophthalic, s-triazinedicarboxylic acid derivative, alkanediols and/or N-heterocyclic diols. The copolyesters are thermoplastics materials from which moulded materials having valuable thermomechanical properties can be manufactured by the customary shaping processes such as casting, injection moulding and extrusion. They are suitable for use as engineering plastic materials and for coating objects.

7 Claims, No Drawings

LINEAR COPOLYESTERS BASED ON TEREPHTHALIC ACID AND/OR ISOPHTHALIC ACID

The present invention relates to linear, thermoplastic copolyesters based on terephthalic acid and/or isophthalic acid, s-triazinedicarboxylic acid derivatives, alkanediols and/or N-heterocyclic diols, a process for their manufacture and their use.

It has already been proposed, in German Offenlegungsschrift (DT-OS) No. 2,121,184, to use s-triazinedicarboxylic acids or esters thereof for the manufacture of polymers, such as polyesters, polyamides, polybenzimidazoles or polybenzoxazalones. Although the polyesters which are manufactured, for example, from s-triazinedicarboxylic acids and alkanediols, are distinguished by high glass transition points, they have the disadvantage that they are difficult to process because relatively high temperatures are required to process them.

Polyalkylene terephthalates, particularly polyethylene terephthalate, have found a broad field of application as engineering plastic materials, since these linear polyesters give shaped articles having high mechanical strength properties when processed by injection moulding or extrusion. Partly crystalline polyethylene terephthlate suffers, however, from the disadvantage of being relatively difficult to process, while amorphous polyethylene terephthalate, which can be processed easily, has a glass transition temperature (Tg) of about 72° C, which is too low for many applications. In the case of polybutylene terephthalate, which is usually present in a partly crystalline form, the Tg is only about 22° C.

There has been no lack of attempts to modify polyalkylene terephthalates in order to obtain linear polyesters having higher Tg values and better processing properties. Thus it is proposed, for example in DT-OS No. 2,342,415, to use hydroxyalkylated 1,1'-methylene-bis-hydantoins as the diol co-component in the manufacture of linear polyesters based on terephthalic acid and/or isophthalic acid. Similarly, it is proposed in DT-OS No. 2,342,431 to use hydroxyalkylated benzimidazolones as the diol co-component. Although the polyalkylene terephthalates modified in this manner have increased Tg values and improved processing properties, the relationship of Tg value to processability, even for these thermoplastic polyesters, is still not satisfactory in all respects for many applications.

It has now been found that copolyesters having Tg values far above 100° C and having a better relationship between Tg value and processability are obtained if terephthalic acid and/or isophthalic acid as well as s-triazinedicarboxylic acids are polycondensed with alkanediols and/or N-heterocyclic diols.

The present invention therefore relates to linear, thermoplastic copolyesters having a relative viscosity of 1.1 to about 3.0, measured at 30° C on a 1% strength solution consisting of equal parts of phenol and tetrachloroethane, which are characterised by the structural elements of the general formula I

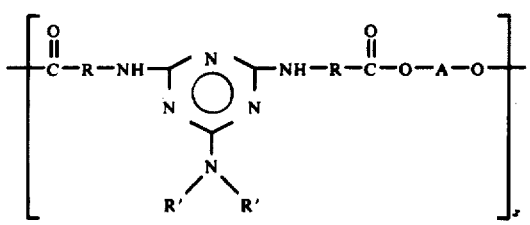

(I)

$$\left[\begin{matrix} O & & & & O \\ \| & & & & \| \\ -C-D-C-O-A-O- \end{matrix}\right]_n$$

wherein R denotes an aliphatic radical having 1 to 6 C atoms or the para-phenylene radical, R' represents methyl, ethyl, phenyl or cyclohexyl, A denotes an aliphatic radical having 2 to 10 C atoms, a N,N'-heterocyclic-aliphatic radical of the formula of the formula or of the formula wherein R" and R''' represent H atoms, chlorine atoms or bromine atoms, or R" represents an H atom and R''' represents a chlorine or bromine atom, and $R_1$ and $R_2$ represent methyl or ethyl or conjointly represent pentamethylene, D denotes the meta- or para-phenylene radical and the mol fraction $$\frac{x}{x+y}$$

formed from x and y has values of 0.01 to 0.99, x and y each denoting a number from 1 to 30.

Preferably, the copolyesters having the structural elements of the formula I have a relative viscosity of 1.3 to 2.5 and, in the formula I, R denotes the para-phenylene radical, R' denotes ethyl or phenyl, A denotes an aliphatic radical having 2 to 4 C atoms, a N,N'-heterocyclic-aliphatic radical of the formula

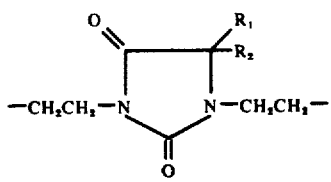

and/or of the formula

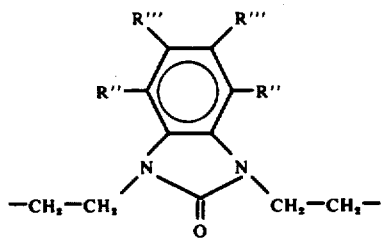

and/or of the formula

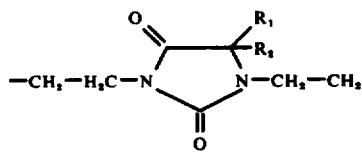

wherein R'' and R''' represent H atoms, chlorine atoms or bromine atoms, and $R_1$ and $R_2$ represent the methyl group, D denotes the meta- or para-phenylene radical and the mol fraction $$\frac{x}{x+y}$$

formed from x and y has values of 0.05 to 0.90 x and y each denoting a number from 1 to 30.

The new copolyesters having the structural elements of the formula I are obtained by known processes, by polycondensing, in a molar ratio corresponding to the mole fraction $$\frac{x}{x+y} = 0.01 \text{ to } 0.99$$

and in the presence of catalysts, in a known manner, to a relative viscosity of 1.1 to 3.0, measured at 30° C on a 1% strength solution consisting of equal parts of phenol and tetrachloroethane, x mols of s-triazinedicarboxylic acids or polyester-forming derivatives thereof, of the formula II

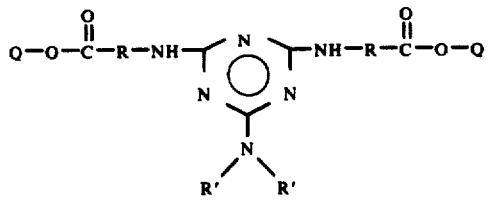

wherein Q represents a hydrogen atom, an alkyl group having 1 to 6 C atoms or the phenyl group and R and R' have the same meaning as in formula I, and y mols of terephthalic acid or isophthalic acid or polyester-forming derivatives thereof, with x + y mols of an aliphatic diol containing 2 to 10 C atoms and/or of a N,N'-heterocyclic-aliphatic diol of the formula III

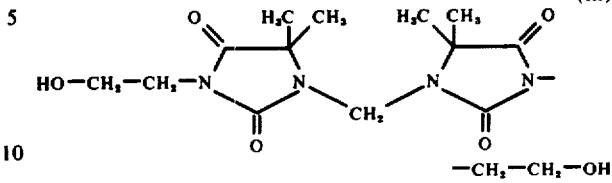

and/or of the formula IV

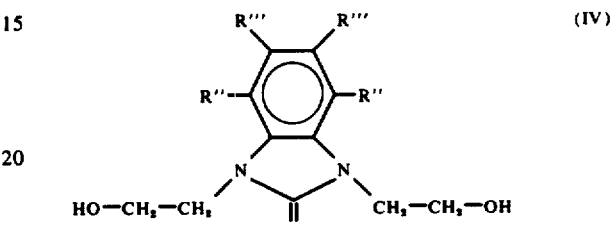

and/or of the formula V

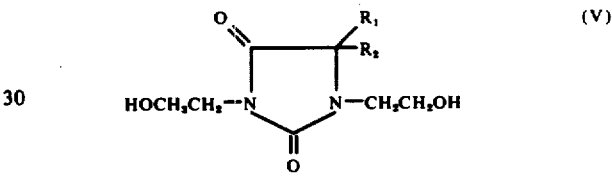

wherein $R_1$, $R_2$, R'' and R''' have the same meaning as in formula I, and wherein x and y denote integers from 1 to 30.

Preferably, x mols of s-triazinedicarboxylic acid diesters of the formula II wherein Q denotes a lower alkyl group having 1 to 4 C atoms or the phenyl group, R denotes the para-phenylene radical and R' represents ethyl or phenyl, and y mols of terephthalic acid dimethyl ester are polycondensed, in a molar ratio corresponding to the mol fraction $$\frac{x}{x+y} = 0.05 \text{ to } 0.90,$$

to a relative viscosity of 1.3 to 2.5, with x + y mols of an aliphatic diol containing 2 to 4 C atoms or of the N,N'-heterocyclic-aliphatic diol of the formula III, IV or V.

The low molecular dialkyl esters having 1 to 4 carbon atoms in the molecule, preferably dimethyl and diethyl esters, or diphenyl esters, are mainly used as the polyester-forming derivatives of the s-triazinedicarboxylic acids of the formula II and of terephthalic acid and isophthalic acid. Furthermore, the acid dihalides, particularly the acid dichlorides, are also suitable.

The s-triazine compounds of the formula II are known compounds, the manufacturing processes for which are described in DT-OS No. 2,121,184. The general process consists in reacting cyanuric acid chloride or an amino-substituted dichloro-s-triazine with aminoacids or aminoacid esters in the presence of a base and water.

1,1'-Methylene-bis-[3-(2-hydroxyethyl)-5,5-dimethylhydantoin] of the formula III is a known compound and can be manufactured by the process described in U.S. Pat. No. 3,679,681, by adding on 2 mols of ethylene oxide to 1,1'-methylene-bis-(5,5-dimethylhydantoin).

Compounds which correspond to the formula IV are 1,3-di-(2-hydroxyethyl)-benzimidazolone, 1,3-di-(2-hydroxyethyl)-4,5,6,7-tetrachlorobenzimidazolone, 1,3-di-(2-hydroxyethyl)-4,5,6,7-tetrabromobenzimidazolone, 1,3-di-(2-hydroxyethyl)-5,6-dichlorobenzimidazolone and 1,3-di-(2-hydroxyethyl)-5,6-dibromobenzimidazolone.

1,3-Di-(2-hydroxyethyl)-benzimidazolone is known from the literature. It can, for example, be obtained by the process described in DT-OS No. 2,342,432 by adding on two mols of ethylene oxide to 1 mol of benzimidazolone. The halogenosubstituted benzimidazolone compounds can be manufactured by chlorinating or brominating 1,3-di-(hydroxyethyl)-benzimidazolone in a known manner.

The compounds of the formula V are known from British Patent Specification No. 1,290,729 (for example Example 12). The new polyesters can also be manufactured by using mixtures of N-heterocyclic diols of the formula IV and mixtures which contain the N-heterocyclic diol of the formula III, and any desired mixing ratio can be selected, that is to say it is not critical.

The known processes for the manufacture of the new copolyesters are, for example, solution condensation or azeotropic condensation, interface condensation, melt condensation or solid phase condensation as well as a combination of these methods, depending on which polyester-forming derivatives and catalysts for the reaction are used.

The new copolyesters can be manufactured by esterifying or transesterifying s-triazinedicarboxylic acids of the formula II and terephthalic acid or isophthalic acid, or the low molecular dialkyl esters of these dicarboxylic acids, with the aliphatic diols and/or the N,N'-heterocyclic-aliphatic diols of the formula III and/or IV and/or V, in an inert atmosphere, for example a nitrogen atmosphere, in the presence of catalysts and with simultaneous removal of the water or, respectively, alkanol formed, at 150°–250° C, and subsequently carrying out the polycondensation at 200°–270° C and under reduced pressure, in the presence of certain catalysts, until the polycondensates have the desired viscosities.

When manufacturing copolyesters which, besides the N,N'-heterocyclic-aliphatic diols, also contain aliphatic diols, it is advantageous to use this diol component in an excess, so that, after the esterification or transesterification reaction, essentially monomeric di-glycol esters of all the dicarboxylic acids are obtained, which are then polycondensed in the presence of a polycondensation catalyst and while distilling off the excess aliphatic diol in vacuo.

Amines, inorganic or organic acids, for example hydrochloric acid or p-toluenesulphonic acid, or metal compounds, which are also suitable for use as transesterification catalysts, can be used in a known manner as the esterification catalysts.

Since some catalysts preferentially accelerate the transesterification and others the polycondensation, it is advantageous to use a combination of several catalysts. Examples of suitable transesterification catalysts are the oxides, salts or organic compounds of the metals calcium, magnesium, zinc, cadmium, magnesium, titanium and cobalt. It is also possible to use the metals as such, as catalysts. The polycondensation is catalysed, for example, by metals such as lead, titanium, germanium and, in particular, antimony, and compounds thereof. These catalysts can be added to the reaction mixture together or separately. These catalysts are employed in quantities of about 0.001 to 1.0 per cent by weight, relative to the acid component.

When manufacturing the new copolyesters it is particularly advantageous to use those catalysts which accelerate both the transesterification and the polycondensation. Catalysts of this kind which can be used are, above all, mixtures of various metals or metal compounds as well as corresponding metal alloys.

The polycondensation reaction is carried out until the polyesters have a relative viscosity of 1.1 to 3.0, preferably 1.1 to 2.5. Depending on the nature of the catalyst used and the size of the batch, the reaction times are about 30 minutes to several hours. The resulting polyester melt is removed from the reaction vessel, cooled in the customary manner, and then granulated or cut into chips.

Another process for the manufacture of the new copolyesters consists in polycondensing s-triazinedicarboxylic acid dihalides and dihalides of terephthalic acid or isophthalic acid, preferably the corresponding acid dichlorides, with the aliphatic diols and/or the N,N'-heterocyclic-aliphatic diols of the formula III and/or the formula IV, in the presence of a basic catalyst, in the temperature range from 0° to 180° C, while eliminating hydrogen halide. Tertiary amines or quaternary ammonium salts are preferably used as the basic catalysts. The proportion of the basic catalyst can be from 0.1 to 100 mol%, relative to the acid halides. This process can also be carried out without a solvent or in the presence of a solvent.

The polycondensation can also be carried out by first condensing the starting compounds, as a melt, until a certain viscosity is reached, then granulating, for example with the aid of an underwater granulator, the precondensate thus produced, drying the granules and then subjecting them to a solid phase condensation in which a vacuum and temperatures below the melting point of the granules are used. Higher viscosities in the polyesters can be achieved in this way.

When working up the polyester melt, or even before the polycondensation reaction, inert additives of all kinds, such as, for example, fillers, reinforcing materials, particularly glass fibres, inorganic or organic pigments, optical brighteners, delustring agents, agents for promoting crystallisation and additives which impart non-inflammable or flame-retarding properties, such as, for example, antimony trioxide and organic compounds which have a high content of chlorine and bromine, can be added to the reaction mass.

If the polycondensation reaction is carried out discontinuously, these known measures can be taken already during the last stages of the condensation, for example in the solid phase condensation or at the end of the melt condensation.

The copolyesters according to the invention can be partly crystalline or amorphous, depending on which dicarboxylic acids and which diols are used as the starting components and the ratios in which these are employed. It is characteristic that partly crystalline polyesters are obtained when a few percent of the s-triazinedicarboxylic acid are incorporated, but amorphous polyesters are obtained when more than 20–30% are incorporated.

Depending on the reaction conditions and the ratio of the starting substances employed, block polyesters are formed, that is to say compounds of the formula I in which $x$ and/or $y$ are 2 or more.

The new copolyesters are colourless to brown-coloured and are thermoplastic materials from which moulded materials having valuable thermo-mechanical properties can be manufactured by the customary shaping processes, such as casting, injection moulding and extrusion. The new copolyesters can be processed readily on conventional injection moulding machines.

The new copolyesters are particularly suitable for use as "engineering plastic" materials which are suitable for the manufacture of shaped articles, such as gear wheels, containers for chemicals or food, machine parts and parts of apparatus, sheets, plates, films, fusion adhesives and coatings, and also for the manufacture of semi-finished products which can be shaped by machining. The copolyesters can also be used for coating objects, for example by the known powder coating processes.

The copolyesters prepared in the examples which follow are characterised more exactly by the following characteristic data: the copolyesters are characterised by those morphological changes which are measured by means of differential thermo-analysis on a sample which is heat-treated for 3 minutes at 30° C above the melting point or softening point and is then rapidly chilled. The chilled sample is heated at a heating-up rate of 16° C/minute by means of a "DSC-2B" differential scanning calorimeter of Messrs. Perkin-Elmer. The glass transition temperature is indicated in the thermogram as the point of inflection at the sudden increase in the specific heat, the crystallisation temperature is indicated as the apex of the exothermic peak and the melting point is indicated as the apex of the endothermic peak. If a Tg range is indicated, for example Tg = 160°–178° C, this means the range in which there is a sudden increase in the specific heat in the thermogram. The relative viscosity of the polycondensates of the examples is determined at 30° C on solutions of 1 g of copolyester in 100 ml of a mixture consisting of equal parts of phenol and tetrachloroethane. The softening point is determined by the Kofler method on a microscope with a heated stage at a heating-up rate of 15° C/minute, a cross being formed from 2 filaments and the softening point being as the temperature at which the sharp angles of the cross disappear. The nitrogen content is determined by elementary analysis.

Preparation examples

Example 1

Polyethylene terephthalate copolyester (called Co-PET in the following text), containing 30 mol% of 2-diethylamino-4,6-bis-(p-carboxyanilino)-s-triazine, A mixture of the following substances is stirred under nitrogen at a reaction temperature of 160° C in a polycondensation apparatus made of glass and equipped with a stirrer, a descending condenser fitted with a receiver, a thermometer and a $N_2$ capillary:
  48.5 g (0.25 mol) of pure dimethyl terephthalate (called "DMT" in the following text),
  48.2 g (0.107 mol) of 2-diethylamino-4,6-bis-(p-methoxycarbonylanilino)-s-triazine, recrystallised, prepared in accordance with DT-OS No. 2,121,184,
  77.5 g (1.25 mols) of ethylene glycol, pure,
  0.05 g of zinc acetate,
  0.05 g of manganese-II acetate,
  0.05 g of calcium acetate and
  0.15 g of antimony trioxide.

The transesterification and the subsequent copolycondensation are carried out while stirring and according to the following reaction conditions:
  2 hours at 160° C → 200° C (rising slowly), $N_2$, 760 mm Hg
  1 hour at 200° C → 220° C, $N_2$, 760 mm Hg
  1 hour at 220° C → 270° C, $N_2$, 760 mm Hg
  1 hour at 270° C, $N_2$, 760 mm Hg → 25 mm Hg
  ½ hour at 270° C → 280° C, $N_2$, 25 mm Hg → 0.3 mm Hg
  ½ hour at 280° C → 290° C, $N_2$, 0.3 mm Hg.

After this polycondensation, $N_2$ is admitted to the apparatus while still at 290° C, and the hot melt is poured out and cooled in air.

This gives an amorphous (transparent), light brown copolyester which has the following properties:
  Relative viscosity: 1.58
  Softening point (Kofler method: 220° C
  Glass transition range (DSC) (measured after the sample has been heated and cooled): 121°–131° C
  Decomposition temperatures (DSC): approx. 350° C.

EXAMPLE 2

Polybutylene terephthalate copolyester (called "Co-PBT" in the following text) containing 30 mol% of 2-diethylamino-4,6-bis-(p-carboxyanilino)-s-triazine.

The transesterification and polycondensation reactions are carried out in an apparatus according to Example 1, in accordance with the reaction conditions below and using the following mixture of substances:
  48.5 g (0.25 mol) of DMT, pure,
  51.2 g (0.107 mol) of 2-diethylamino-4,6-bis-(p-ethoxyccarbonylanilino)-s-triazine, recrystallised (prepared in accordance with DT-OS No. 2,121,184).
  112.5 g (1.25 mols) of butane-1,4-diol and
  0.1 g of tetraisopropyl ortho-titanate.

The following conditions are maintained while stirring and while distilling off the volatile constituents:
  1 hour at 150° C → 220° C, $N_2$, 760 mm Hg
  1 hour at 220° C → 270° C, $N_2$, 760 mm Hg
  45 minutes at 270° C, $N_2$, 760 mm Hg → 0.3 mm Hg
  1 hour at 270° C → 300° C, $N_2$, 0.3 mm Hg.

The copolyester obtained in this way softens at 150° C and has a relative viscosity of 1.35. Its glass transition range is 70° C to 82° C.

EXAMPLE 3

"Co-PET" containing 50 mol% of 2-diethylamino-4,6-bis-(p-carboxyanilino)-s-trazine.

The following mixture of substances is reacted in accordance with Example 1:
  48.5 g (0.25 mol) of DMTT, pure,
  112.6 g (0.25 mol) of 2-diethylamino-4,6-bis-(p-methoxycarbonyl)-s-triazine,
  93.0 g of (1.5 mols) of ethylene glycol
  0.03 of of calcium acetate,
  0.05 g of zinc acetate,
  0.03 g of manganese acetate and
  0.15 g of antimony trioxide.

Transesterification and co-polycondensation are carried out as described in Example 1. This gives a light brown, glass-clear polycondensate which has the following characteristic data:
  Softening point (Kofler method): 190° C
  Relative viscosity: 1.40
  Glass transition range (DSC) measured after the sample has been heated and cooled): 157°–174° C
  Decomposition temperature: approx. 320° C.

EXAMPLE 4

Co-PBT containing 50 mol% of 2-diethylamino-4,6-bis-(p-carboxyanilino)-s-triazine The following substances are reacted in accordance with the temperature-pressure programme described in Example 2, using 0.05 g of tetraisopropyl ortho-titanate as the catalyst:
  17.5 g (0.09 mol) of DMT, pure,
  43.1 g (0.09 mol) of 2-diethylamino-4,6-bis-(p-ethoxycarboxylanilino)-s-triazine, crystalline, and
  48.6 g (0.54 mol) of butane-1,4-diol, pure.

The reaction, which is carried out in accordance with Example 2, gives copolyester which is clear and transparent, has a slight brown colour and has the following characteristic data:
  Softening point (Kofler method): 185° C
  Relative viscosity: 1.60
  Glass transition range (DSC): 99°–112° C

EXAMPLE 5

Co-PBT containing 90 mol% of 2-diethylamino-4,6-bis-(p-carboxyanilino)-s-triazine The mixture which follows is polycondensed in accordance with the procedure described in Example 2, using 0.1 g of tetraisopropyl ortho-titanate as the catalyst:
  5.4 g (0.0278 mol) of DMT, pure,
  112.6 g (0.25 mol) of 2-diethylamino-4,6-bis-(p-methoxycarbonylanilino)-s-trazine, recrystallised, and
  90.1 g (1.0 mol) of 1,4-butanediol.

This gives an amorphous copolyester which softens at 172° C and has a relative viscosity of 1.36. The glass transition range (DSC) is 133° C–140° C.

EXAMPLE 6

PET containing 30 mol% of 2-diphenylaminp-4,6-bis-(p-carboxyanilino)-s-triazine.

Method (a): from 2 -diphenylamino-4,6-bis-(p-ethoxycarbonlanilino)-s-triazine

The following substances are polycondensed in accordance with Example 1, using the catalyst mixture given below:
  48.5 g (0.205 mol) of DMT, pure,
  61.5 g (0.107 mol) of 2-diphenylamino-4,6-bis-(p-ethoxycarbonylanilino)-s-triazine, pure, and
  77.5 g (1.25 mols) of ethylene glycol, pure.

Catalyst mixture:
  0.05 g of zinc acetate,
  0.02 g of manganese acetate,
  0.03 g of calcium acetate and
  0.15 g of antimony trioxide.

The copolyester obtained in this way is amorphous and glass-clear and has a slight light-ochre coloration. The material has the following characteristic data:
  Softening point (Kofler method): 230° C
  Relative viscosity: 1.51
  Glass transition range (measured after the sample has been heated and cooled): 137°– 150° C
  Decomposition temperature: approx. 350° C.

Method (b): from 2-diphenylamino-4,6-bis-(p-methoxycarbonylanilino)-s-triazine

The reaction is carried out in exact analogy to Example 6(a), but the 61.5 g of 2-diphenylamino-4,6-bis-(p-ethoxycarbonylanilino)-s-triazine are replaced by 58.5 g of 2-diphenylamino-2,4-bis-(p-methoxycarbonylanilino)-s-triazine (0.107 mol).

This gives a tough, amorphous polyester which softens at 218° C and has a relative viscosity of 1.60.

EXAMPLE 7

Co-PET containing 50 mol% of 2-diphenylamino-4,6-bis-(p-carboxyanilino)-s-triazine 48.5 g (0.25 mol) of pure DMT and 143.6 g (0.25 mol) of 2-diphenylamino-4,6-bis-(p-ethoxycarbonylanilino)-s-triazine are reacted, exactly as in Example 6(a), with 111.6 g of ethylene glycol and the mixture is polycondensed, the reaction being catalysed with a mixture consisting of:
  0.05 g of calcium acetate,
  +0.05 g of manganese acetate,
  +0.05 g of zinc acetate and
  +0.2 g of antimony trioxide.

This gives a copolyester having the following properties:
  Relative viscosity: 1.37
  Softening point (Kofler method): 222° C
  Glass transition range (measured after storing for 5 hours/210° C): 168°–181° C
  Decomposition temperature: approx. 330° C If the foregoing batch is polycondensed using 136.6 g (0.25 mol) of 2-diphenylamino-4,6-bis-(p-methoxycarbonylanilino)-s-triazine instead of 143.6 g of the diethyl ester used in the foregoing text, the reaction time is trebled owing to the poorer solubility of the dimethyl ester. In other respects an analogous procedure can be followed.

The properties of the resulting copolymer are virtually identical:
  Relative viscosity: 1.38
  Softening point (Kofler method): 215° C.

EXAMPLES 8, 9 and 10

Co-PBT having 50 mol% or 90 mol% of 2-diphenylamino-4,6-bis-(p-carboxyanilino)-s-triazine In each case, 1 mol (90.1 g) of butane-1,4diol is polycondensed, in the presence of 0.1 of tetraisopropyl ortho-titanate, exactly as described in Example 2, with a mixture of:

| | |
|---|---|
| 0.15 mol (29.1 g) 0.15 mol (86.2 g) of pure "DMT" and of 2-diphenylamino-4,6-bis-(p-ethoxycarbonylanilino)-s-triazine | Example 8 | or with a mixture of:

| | Example 9 |
|---|---|
| 0.0278 mol (5.4 g) 0.25 mol (143.6 g) of pure "DMT" and of 2-diphenylamino-4,6-bis-(p-ethoxycarbonyl-anilino)-s-triazine | | or with a mixture of:

| | Example 10 |
|---|---|
| 0.0278 mol (5.4 g) 0.25 mol (136.0 g) of pure "DMT" and of 2-diphenylamino-4,6-bis-(p-methoxycarbonylanilino)-s-triazine. | |

The resulting copolyesters have the properties indicated in the following table:

| | Example 8 | Example 9 | Example 10 |
|---|---|---|---|
| Composition | "Co-PBT" having 50 mol% of 2-diphenylamino-4,5-bis-(p-carbonxy-anilino-s-triazine | "Co-PBT" having 90 mol% of | "Co-PBT" having 90 mol% of |
| Relative viscosity | 1.35 | 1.51 | 1.39 |
| Softening point (Kofler method) | 190° C | 214° C | 216° C |
| Glass transition range (DSC) (measured after heating up and cooling) | 120–137° C | 156–171° C | 166–179° C |

EXAMPLES 11 and 12

Co-PBT having 30 mol% or 50 mol% of 2-diethylamino-4,6-bis-(2'-carboxyethylamino)-s-triazine 67.5 g (0.75 mol) of butane-1,4-diol are transesterified and polycondensed, in the presence of 0.05 g of tetraisopropyl ortho-titanate, in exact analogy to Example 2, with:

| | Example 11 |
|---|---|
| 29.1 g (0.15 mol) 20.9 g (0.064 mol) of "DMT" and of 2-diethylamino-4,6-bis-(2'-carboxyethylamino)-s-triazine | | or with:

| | Example 12 |
|---|---|
| 24.03 g (0.125 mol) 40.8 g (0.125 mol) of "DMT" and of 2-diethylamino-4,6-bis-(2'-carboxyethylamino)-s-triazine. | |

Copolyesters having the following properties are obtained:

| | Example 11 | Example 12 |
|---|---|---|
| Composition | "Co-PBT" having 30 mol% of 2-diethylamino-4,6-bis-(2'-carboxyethylamino)-s-triazine | "Co-PBT" having 50 mol% of |
| Relative viscosity | 1.42 | 1.50 |
| Softening point Kofler method) | 165° C | approx. 75° C |
| Glass transition range (DSC) | 23–33° C partly crystalline ($T_c = 113°$ C) | 27–39° C amorphous |

EXAMPLE 13

Co-PBT having 30 mol% of 2-diphenylamino-4,6-bis-(5'-carboxy-n-pentylamino)-s-triazine A mixture of:
12.14 g (0.0625 mol) of DMT,
13.53 g (0.0267 mol) of 2-diphenylamino-4,6-bis-(5'-carboxy-n-pentylamino)-s-triazine,
28.15 g (0.3125 mol) of butane-1,4-diol and
0.025 g of tetraisopropyl ortho-titanate
is polycondensed as described in greater detail in Example 2. This gives an amorphous, light yellowish, very tough copolyester, the softening point of which is 145°C and which has a relative viscosity of 2.39. The glass transition range is between 29° and 40° C.

EXAMPLE 14

Co-PBT containing 30 mol% of 2-diphenylamino-4,6-bis-(p-carboxyanilino)-s-triazine.

If, in Example 2, the -0.107 mol of 2-diethylamino-4,6-bis-(p-ethoxycarbonylanilino)-s-triazine is replaced by 0.107 mol of the 2-diphenylamino derivative and the procedure described in Example 2 is otherwise followed exactly, a virtually colourless copolyester is obtained, which has the following thermo-mechanical values:

Glass Transition temperature $T_g$ (DSC) (measured after the sample has been heated and cooled) = 87°–104° C Decomposition temperature: above 320° C.

EXAMPLES 15 and 16

Co-PBT or Co-PET containing 50 mol% of 2-dicyclohexylamino-4,6-bis-(p-carboxyanilino)-s-triazine Replacing the 0.15 mol of 2-diphenylamino-4,6-bis-(p-ethoxycarbonylanilino)-s-triazine in Example 8 by 0.15 mol of the corresponding 2-dicyclohexylamino derivative, and following the procedure in other respects exactly in accordance with Example 8, gives a copolyester having the values shown below:

Replacing the 0.25 mol of 2-diphenylamino-4,6-bis-(p-ethoxycarbonylanilino)-s-triazine in Example 7 by corresponding quantities of the 2-dicyclohexylamino derivative gives a copolyester having the following data:

|  | Example 15 | Example 16 |
| --- | --- | --- |
|  | "Co-PBT" having 50 mol% of | "Co-PET" having 50 mol% of |
| Composition | 2-dicyclohexylamino-4,6-bis-(p-carboxy-anilino)-s-triazine | |
| Relative viscosity | 1.25 | 1.30 |
| Softening point (Kofler method) | 185° C | 197° C |
| Glass transition range (DSC) | 113–129° C | 160–173° C |
| Decomposition temperature | 343° C | 350° C |

EXAMPLE 17

Copolyester formed from 90 mol% of 2-diphenylamino-4,6-bis-(p-ethoxycarbonylanilino)-s-triazine, 10 mol% of dimethyl isophthalate, and butanediol A mixture of 25.4 g (0.045 mol) of 2-diphenylamino-4,6-bis-(p-ethoxycarbonylanilino)-s-triazine, 9.7 g (0.005 mol) of dimethyl isophthalate and 27 g (0.3 mol) of 1,4-butanediol is transesterified for 2 hours at 150–200° C, using 0.03 g of tetraisopropyl ortho-titanate as the catalyst, and is then polycondensed under the following conditions:

1 hour / 200° C → 220° C / normal pressure / $N_2$ / stirring
1 hour / 220° C → 235° C / normal pressure / $N_2$ / stirring
1 hour / 235° C → 260° C / 760 mm Hg → 20 mm Hg / stirring
1 hour / 260° C → 270° C / 20 mm Hg → 0.08 mm Hg / stirring.

The copolyester thus formed is cooled by being poured out on a metal sheet. The product has the following properties:

Softening point (Kofler method) : 155° C
Relative viscosity : 1.48
Glass transition temperature (DSC) : 108°–123° C

EXAMPLE 18

Copolyester formed from 99 mol% of 2-diphenylamino-4,6-bis-(p-ethoxycarbonylanilino)-s-triazine, 1 mol% of dimethyl terephthalate, and 1,10-decanediol and ethylene glycol The mixture described in the following text is subjected to transesterification and polycondensation in accordance with Example 1, using the catalyst system set out below:

56.88 g (0.099 mol) of 2-diphenylamino-4,6-bis-(p-ethoxycarbonylanilino)-s-triazine,
0.194 g (0.001 mol) of dimethyl terephthalate,
17.42 g (0.1 mol) of 1,10-decanediol and
6.2 g (0.1 mol) of ethylene glycol.

```
0.02 g of zinc acetate,
0.02 g of manganese-II acetate,   } Catalyst
0.01 g of calcium acetate and
0.08 g of antimony trioxide.
```

This gives a copolyester having the following properties:

Softening point (Kofler method): 190° C
Relative viscosity: 1.43
Glass transition range (DSC): 129°–143° C
Decomposition temperature (DSC): 362° C.

EXAMPLE 19

Copolyester formed from 1 mol% of 2-diphenylamino-4,6-bis-(p-ethoxycarbonylanilino)-s-triazine, 99 mol% of dimethyl terephthalate (DMT), 30 mol% of 1,1'-methylene-bis-[3-(2'-hydroxyethyl)-5,5-dimethylhydantoin] and ethylene glycol A mixture of 0.575 g (0.001 mol) of 2-diphenylamino-4,6-bis-(p-ethoxycarbonylanilino)-s-triazine, 19.4 g (0.099 mol) of DMT, 10.7 g (0.03 mol) of 1,1'-methylene-bis-[3-(2'-hydroxyethyl)-5,5-dimethylhydantoin] and 15.5 g (0.25 mol) of ethylene glycol is transesterified and polycondensed with the aid of the following catalyst system and in accordance with the reaction conditions set out below:

```
0.01 g of zinc acetate,
0.005 g of manganese-II acetate,  } Catalyst
0.005 g of calcium acetate and
0.03 g of antimony trioxide,
```

2 hours / 150° C → 200° C / $N_2$ normal pressure / stirring
2 hours 200 ° C → 240° C / $N_2$ normal pressure / stirring
0.75 hour / 240° C → 270° C / $N_2$ / 760 mm Hg → 15 mm Hg / stirring
1 hour / 270° C → 275° C / $N_2$ / 15 mm Hg → 0.3 mm Hg / stirring.

This gives a clear copolyester having a slight yellowish colour and the following properties:

Softening point (Kofler method): 140° C
Relative viscosity: 1.32
Glass transition range (DSC): 97°–105° C
Decomposition temperature (DSC): 325° C.

EXAMPLE 20

Copolyester formed from 50 mol% of 2-diphenylamino-4,6-bis-(p-ethoxycarbonylanilino)-s-triazine, 50 mol% of DMT and 1,3-di-(2-hydroxyethyl)-4,7-dichloro-5,6-dibromobenzimidazolone and butanediol.

A mixture of 14.37 g (0.025 mol) of 2-diphenylamino-4,6-bis-(p-ethoxycarbonylanilino)-s-triazine, 4.87 g (0.025 mol) of DMT, 22.42 g (0.05 mol) of 1,3-di-(2'-hydroxyethyl)-4,7-dichloro-5,6-dibromobenzimidazolone and 90.1 g (1 mol) of butane-1,4-diol is transesterified and polycondensed under the conditions set out in the following text, using 0.15 g of tetraisopropyl ortho-titanate as the catalyst:

2 hours / 150° C → 200° C / $N_2$ / normal pressure / stirring 2 hours / 200° C → 240° C / $N_2$ / normal pressure / stirring
1 hour / 240° C → 280° C / $N_2$ / 760 mm Hg → 20 mm Hg / stirring
0.5 hour / 280° C → 290° C / $N_2$ / 20 mm Hg → 0.05 mm Hg / stirring.

The copolyester obtained in this way has the following data:

Softening point (Kofler method) : 210° C

Relative viscosity : 1.23
Glass transition range (DSC) : 166°–180° C.

EXAMPLE 21

Copolyester from 50 mol% of each of dimethyl terephthalate and 2-diphenylamino-4,6-bis-(p-ethoxycarbonylanilino)-s-triazine, and 1,3-(dihydroxyethyl)-5,5-dimethylhydantoin and ethylene glycol A mixture of 19.4 g (0.1 mol) of pure dimethyl terephthalate, 54.0 g (0.1 mol) of 1,3-di-(2'-hydroxyethyl)-5,5-dimethylhydantoin and 43.5 g (0.7 mol) of ethylene glycol is transesterified for 2 hours, while stirring, at a temperature between 150° and 210° C and under a nitrogen atmosphere, using 0.07 g of calcium acetate and 0.07 g of manganese-II acetate as the catalyst, while distilling off the methanol and ethanol. 0.14 g of antimony trioxide is then added and the mixture is polycondensed in accordance with the following programme:

1 hour / 210° C → 260° C / $N_2$ atmosphere/700 mm Hg 30 minutes / 260° C → 275° C / $N_2$ / 15 mm Hg 30 minutes / 275° C → 310° C / $N_2$ / 0.25 mm Hg.

This gives an amorphous copolyester which has a clear transparency and a slight brownish colour. The copolyester has a relative viscosity of 1.51 and its softening point is 217° C.

APPLICATION EXAMPLE

EXAMPLE I

The copolyester obtained in accordance with Example 6 is ground in a cutter mill to give granules of an average diameter of 2–3 mm. The granules are dried for 12 hours at 110° C. After this preliminary treatment, the product is fed into the granule container of an Arburg Allrounder 100 screw injection moulding machine for processing tests. Fault-free DIN* standard small bars, which are easily released from the mould, can be injection-moulded at the following settings:
* DIN = Deutsche Industrie-Norm (German Industrial Standards)

Intake zone: 200° C
Plasticising zone: 220° C
Injection pressure: 60 atmospheres gauge (excess pressure above atmospheric)
Follow-up pressure: 60 atmospheres gauge
Mould temperature: 30° C
Cycle time: 34 seconds.

The test pieces (standard small bars) obtained in this way have the following properties:

Relative viscosity: 1.48 (1.51 before processing)
Flexural strength (VSM**): 9.5 – 10.5 kg/mm$^2$
Impact strength (VSM): 36 – 88 cm.kg/cm$^2$
** VSM = Vereinigung Schweizerischer Maschinenindustrieller (Association of Swiss Machinery Manufacturers)

I claim:

1. A linear, thermoplastic copolyester having a relative viscosity of 1.1 to 3.0, measured at 30° C on a 1% strength solution consisting of equal parts of phenol and tetrachloroethane, which are characterised by the structural elements of the general formula I

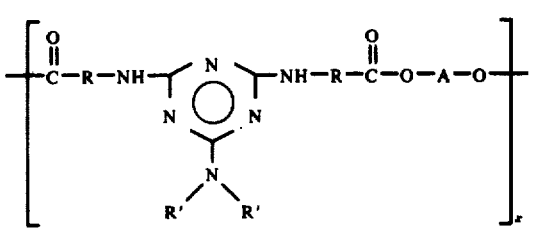

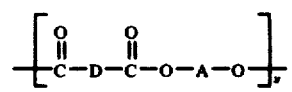

wherein R denotes an aliphatic radical having 1 to 6 C atoms or the para-phenylene radical, R' represents methyl, ethyl, phenyl or cyclohexyl, A denotes a diradical selected from the group consisting of an aliphatic radical having 2 to 10 atoms, an N,N'-heterocyclic-aliphatic radical of the formula

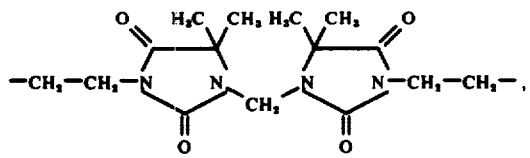

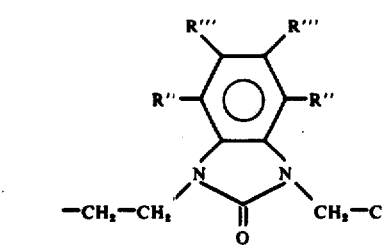

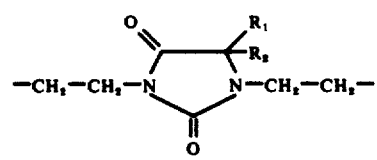

wherein R" and R'" represent H atoms, chlorine atoms or bromine atoms, or R" represents an H atom and R'" represents a chlorine or bromine atom, and $R_1$ and $R_2$ represent methyl or ethyl or conjointly represent pentamethylene, D denotes the meta- or para-phenylene radical and the mol fraction

formed from $x$ and $y$ has values of 0.01 to 0.99, $x$ and $y$ each denoting a number from 1 to 30.

2. A copolyester according to claim 1, having a relative viscosity of 1.3 to 2.5, characterised in that, in the formula 1, R denotes the para-phenylene radical, R' denotes ethyl or phenyl, A denotes an aliphatic radical having 2 to 4 C atoms, a N,N'-heterocyclic-aliphatic radical of the formula

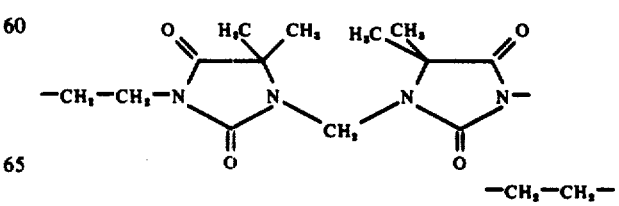

of the formula

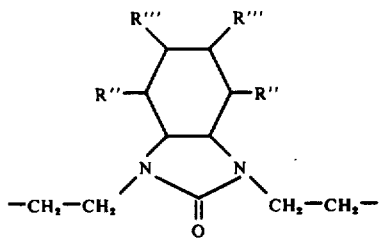

or of the formula

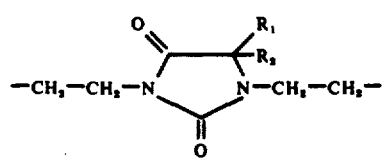

wherein R″ and R‴ represent H atoms, chlorine atoms or bromine atoms, and $R_1$ and $R_2$ represent the methyl group, D denotes the meta- or para-phenylene radical and the mol fraction

formed from $x$ and $y$ has values of 0.05 to 0.90, $x$ and $y$ each denoting a number from 1 to 30.

3. A copolyester according to claim 1, characterised in that the expression in the bracket marked with the index $y$ denotes ethylene terephthalate or butylene terephthalate.

4. Process for the manufacture of a linear, thermoplastic copolyester having the structural elements of the formula

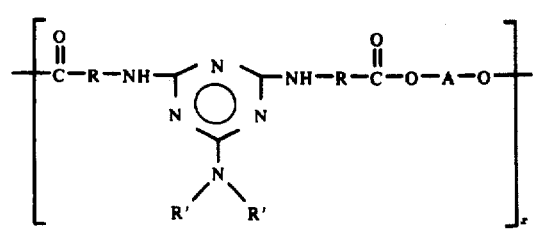

(I)

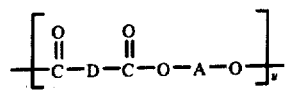

wherein R denotes an aliphatic radical having 1 to 6 C atoms or the para-phenylene radical, R′ represents methyl, ethyl, phenyl or cyclohexyl, A denotes a diradical selected from the group consisting of an aliphatic radical having 2 to 10 C atoms, an N,N′-heterocyclic-aliphatic radical of the formula

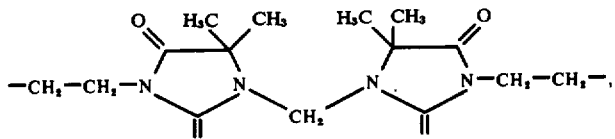

[of the formula]

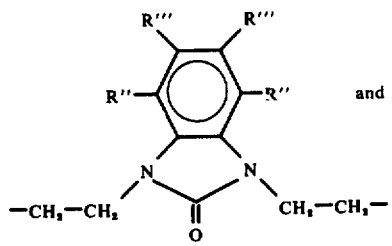

and

[or of the formula]

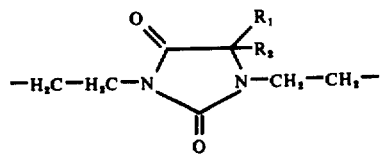

wherein R″ and R‴ represents H atoms, chlorine atoms or bromine atoms, or R″ represents a H atom, R‴ represents a chlorine or bromine atom, and $R_1$ and $R_2$ represent methyl or ethyl or conjointly represent a pentamethylene group, D denotes the meta- or para-phenylene radical and $x$ and $y$ each represent a number from 1 to 30, characterised in that $x$ mols of a s-triazinedicarboxylic acid or polyester-forming derivatives thereof, of the formula II

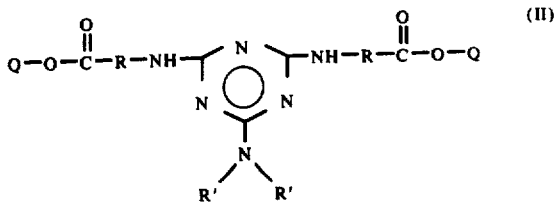

(II)

wherein Q represents a hydrogen atom, an alkyl group having 1 to 6 C atoms or the phenyl group, and $y$ mols of terephthalic acid or isophthalic acid or polyester-forming derivatives thereof are polycondensed, in a molar ratio corresponding to the mol fraction $$\frac{x}{x+y} = 0.01 \text{ to } 0.99$$

and in the presence of catalysts, to a relative viscosity of 1.1 to 3.0, measured at 30° C on a 1% strength solution consisting of equal parts of phenol and tetrachloroethane, with $x$ plus $y$ mols of a diol selected from the group consisting of an aliphatic diol containing 2 to 10 C atoms an N,N'-heterocyclic-aliphatic diol of the formula III

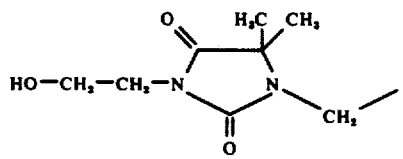 (III)

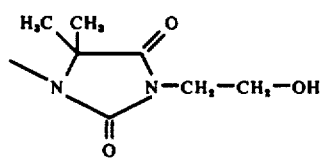

of the formula IV

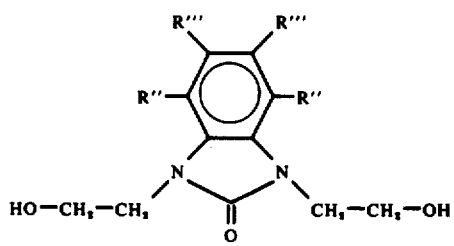 (IV)

and
of the formula V (V)

5. Process according to claim 4, characterised in that $x$ mols of s-triazinedicarboxylic acid diesters of the formula II, wherein Q denotes a lower alkyl group having 1 to 4 C atoms, or the phenyl group, R denotes the para-phenylene radical and R' represents ethyl or phenyl, and $y$ mols of terephthalic acid dimethyl ester are polycondensed, in a molar ratio corresponding to the mol fraction $$\frac{x}{x+y} = 0.05 \text{ to } 0.90,$$

to a relative viscosity of 1.3 to 2.5, with x plus y mols of an aliphatic diol containing 2 to 4 C atoms or of the N,N'-heterocyclic-aliphatic diol of the formula III, IV or V.

6. Process according to claim 4, characterised in that 2-diethylamino-4,6-(p-methoxycarbonylanilino)-s-triazine, 2-diphenylamino-4,6-bis-(p-ethoxycarbonylanilino)-s-triazine, 2-diethylamino-4,6-(2'-carboxyethylamino)-s-triazine, 2-diphenylamino-4,6-bis-(5'-carboxy-n-pentylamino)-s-triazine or 2-dicyclohexylamino-4,6-bis-(p-ethoxycarbonylanilino)-s-triazine is used as the compound of the formula II.

7. Process according to claim 4, characterised in that dimethyl terephthalate is used as the terephthalic acid derivative.

* * * * *